United States Patent
Bachu et al.

(10) Patent No.: US 9,274,907 B1
(45) Date of Patent: Mar. 1, 2016

(54) DECOMMISSIONING OF VIRTUAL BACKUP APPLIANCES

(71) Applicant: EMC Corporation, Hopkinton, MA (US)

(72) Inventors: Kiran Bachu, Cupertino, CA (US); Bala Vijayakumar, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 92 days.

(21) Appl. No.: 14/135,385

(22) Filed: Dec. 19, 2013

(51) Int. Cl.
*G06F 11/00* (2006.01)
*G06F 11/20* (2006.01)
*G06F 11/14* (2006.01)

(52) U.S. Cl.
CPC ........ *G06F 11/2094* (2013.01); *G06F 11/1458* (2013.01); *G06F 11/1461* (2013.01)

(58) Field of Classification Search
CPC .......................... G06F 11/1458; G06F 11/1461
See application file for complete search history.

(56) References Cited

U.S. PATENT DOCUMENTS

| 6,810,421 | B1 * | 10/2004 | Ishizaki et al. | 709/226 |
| 2005/0278397 | A1 * | 12/2005 | Clark | 707/204 |
| 2011/0276806 | A1 * | 11/2011 | Casper et al. | 713/189 |

* cited by examiner

*Primary Examiner* — Charles Ehne
(74) *Attorney, Agent, or Firm* — Blakely, Sokoloff, Taylor & Zafman LLP

(57) ABSTRACT

Various methods and techniques are disclosed to manage resources of virtual backup appliances in a backup and recovery network. In one embodiment, a backup server receives a request to decommission a virtual backup appliance (VBA) of a first primary storage system. The backup server is configured to manage backup operations to back up data from a plurality of primary storage systems to a backup storage system over a network, where each primary storage system has one or more VBA that carry out backup operations. In response to the request, the backup server transmits a first request to the first primary storage system over the network to delete data and metadata related to the data associated with the VBA. The back up server then determines whether the backup storage system contains data associated with the requested VBA. Upon the determination, the backup server transmits a second request to the backup storage system to delete the data associated with the requested VBA from the backup storage system. The backup server then deletes a second metadata associated with the VBA, and then unregisters the VBA from the backup and recovery network.

18 Claims, 9 Drawing Sheets

US 9,274,907 B1

DECOMMISSIONING OF VIRTUAL BACKUP APPLIANCES

FIELD OF THE INVENTION

Embodiments of the present invention relate generally to data storage systems. More particularly, embodiments of the invention relate to decommissioning of Virtual Backup Appliances (VBA) of a backup storage system.

BACKGROUND

Institutions protect their data by developing backup and recovery systems. With virtual technology, the cost to develop, maintain, or extend backup and recovery systems can be controlled. Virtual backup and recovery technologies developed using deduplicating storage systems are available from EMC® Corporation of Hopkinton, Mass. Using such technologies, virtual machines (VMs) can be employed to perform backup of data, including but not limited to, virtual machine images and other data files (e.g., text file, programs, applications, server authentication information, etc.). Throughout this disclosure, such a backup virtual machine is referred to as a virtual backup appliance (VBA).

Typically a VBA is maintained within a VM. It can be deleted or removed and redeployed. In some other cases, a user may want to wipe off everything associated with a VBA and start over again. When a VBA is deleted, there may be some stale metadata and/or the actual data of the deleted VBA in other places such as a backup application. Such removal of a VBA is referred to as decommission of a VBA. Decommission is useful in cleaning up stake backups and restart. It is also useful when the backup software rolls back and hence the VBA becomes stale. It has been a lack of an efficient mechanism to allow a user to initiate efficient decommission of VBAs.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a VBA decommission mechanism is utilized to provide a user an option to decommission a VBA so that the user can reclaim the associated resources (e.g., storage space) and expire all the backup data associated with the VBA. The backup data of a VBA can be stored in an internal or local storage system such as a local primary storage or local backup server. Alternatively, the backup data of the VBA can be backed up or replicated to a remote storage system (also referred to as a target storage system) such as a deduplicated storage system. The backup operations may be initiated or managed by a backup application or software running within a backup server or backup management server.

In the case that the backup data is stored in a local storage system, the backup software maintains a copy of metadata for reporting, cross syncing, restoration, expiration, deletion. The metadata stored in the backup server encompasses VBA's backup identifier(s) and statistics. The backup software utilizes VBA's backup identifier(s) to perform queries and deletions from the VBA. In the case that the backup data is stored in a remote backup storage system, the backup software communicates with the backup storage system to remove the physical data and the associated metadata.

Figure 1:
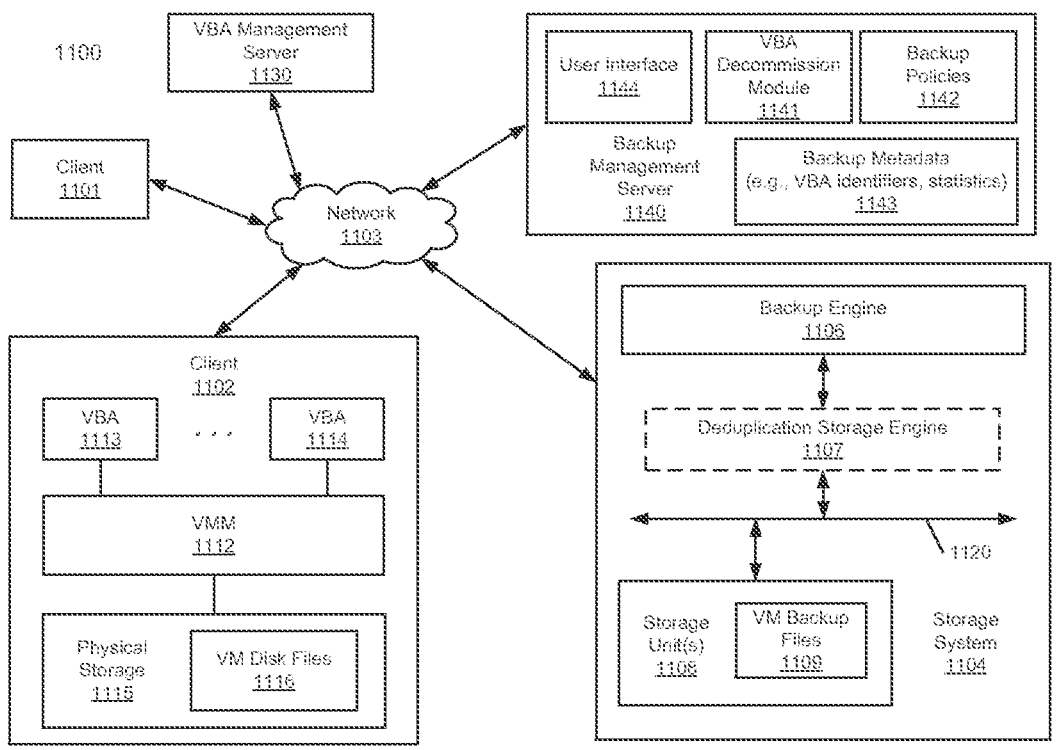
FIG. 1 is a block diagram illustrating a storage system according to one embodiment of the invention.

FIG. 1 is a block diagram illustrating a storage system according to one embodiment of the invention. Referring to FIG. 1, system 1100 includes, but is not limited to, one or more client systems 1101-1102 communicatively coupled to storage system 1104 over network 1103. Clients 1101-1102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 1103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 1104 may include any type of server or cluster of servers. For example, storage system 1104 may be a storage server used for any of various different purposes, such as to provide multiple users with access to shared data and/or to back up mission critical data. Storage system 1104 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 1104 may have a distributed architecture, or all of its components may be integrated into a single unit. Storage system 1104 may be implemented as part of an archive and/or backup system such as a deduplication storage system available from EMC® Corporation of Hopkinton, Mass.

In one embodiment, storage system 1104 includes, but is not limited to, backup engine 1106, deduplication storage engine 1107, and one or more storage units 1108-1109 communicatively coupled to each other. Storage units 1108-1109 may be implemented locally (e.g., single node operating environment) or remotely (e.g., multi-node operating environment) via interconnect 1120, which may be a bus and/or a network. In one embodiment, one of the storage units 1108-1109 operates as an active storage to receive and store external or fresh user data, while the other storage unit operates as a target storage unit to periodically archive data from the active storage unit according to an archiving policy or scheme. Storage units 1108-1109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1108-1109 may also be combinations of such devices. In the case of disk storage media, the storage units 1108-1109 may be organized into one or more volumes of Redundant Array of Inexpensive Disks (RAID).

In response to a data file to be stored in storage units 1108-1109, optional deduplication storage engine 1107 is configured to segment the data file into multiple segments according to a variety of segmentation policies or rules. Deduplication storage engine 1107 only stores a segment in a storage unit if the segment has not been previously stored in the storage unit. In the event that a segment has been previously stored, metadata stores information enabling the reconstruction of a file using the previously stored segment. As a result, segments of data files are stored in a deduplicated manner, either within each of storage units 1108-1109 or across at least some of storage units 1108-1109. Data stored in the storage units may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different storage units may use different compression methods (e.g., main or active storage unit from other storage units, one storage unit from another storage unit, etc.).

The metadata may be stored in at least some of storage units 1108-1109, such that files can be accessed independent of another storage unit. Metadata of each storage unit includes enough information to provide access to the files it contains. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units).

In one embodiment, the storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, backup engine 1106 is configured to backup data from client systems 1101-1102 and to store the backed up data in one or more of storage units 1108, which may be deduplicated by deduplication storage engine 1107. In one embodiment, backup engine 1106 can back up data from a client system that is stored in a virtual operating environment such as a VM provided by a variety of VM vendors such as VMware®. The data can be backed up without having to install a backup agent within the corresponding VM and/or without having to mount the corresponding VM disk on a proxy server. Further, instead of backing up the entire VM disk, a portion or subdirectory of the VM disk can be backed up.

In this example, client 1102 includes one or more VMs 1113-1114 hosted by VM monitor or manager (VMM) 1112, where VMs 1113-1114 include virtual backup application or software executed therein to perform backup operations of data in a local storage system and/or a remote backup storage such as storage system 1104. The VMs having the respective backup application software executed therein are referred to as virtual backup appliance (VBAs). Data of each of VMs 1113-1114 is stored in one of VM disk files 1116 in physical storage 1115 (e.g., local storage) representing a virtual storage device of the associated VM. Data stored in VM disk files may be optionally deduplicated by a deduplication storage engine. VMs 1113-1114 may be managed by a remote VBA management server 1130 (e.g., vCenter from VMware), which may be operated by a third party entity that is different than an entity of backup server 1140.

A virtual machine represents a completely isolated operating environment with a dedicated set of resources associated with. A virtual machine may be installed or launched as a guest operating system (OS) hosted by a host OS. Typically, a host OS represents a virtual machine monitor (VMM) (also referred to as a hypervisor) for managing the hosted virtual machines. A virtual machine can be any type of virtual machines, such as, for example, hardware emulation, full virtualization, para-virtualization, and operating system-level virtualization virtual machines. Different virtual machines hosted by a server may have the same or different privilege levels for accessing different resources.

According to one embodiment, backup engine 1106 is to parse a virtual disk file of a VM (e.g., virtual disk files 1116 of VMs 1113-1114) to generate metadata describing content files of stored in a virtual storage device of the VM. In one embodiment, backup engine 1106 of storage system 1104 accesses the VM disk file of a data processing system such as client system 1102 hosting one or more VMs, where each VM corresponds to a virtual disk file storing content files of a virtual storage device of the respective VM. In one embodiment, backup engine 1106 remotely accesses over network 1103 virtual disk file 1116 via an API of VMM 1112 (e.g., virtual storage API) to parse virtual disk file 1116 to generate metadata representing the content files contained in the virtual disk file. In one embodiment, backup engine 1106 communicates with the VMM 1112 to cause the VMM 1112 to generate a snapshot of the virtual disk file 1116 and to generate the metadata based on the snapshot of the virtual disk file.

In one embodiment, the metadata is utilized to generate a file index database (e.g., metadata database, not shown) that can be queried subsequently for backup purposes. The file index database can be implemented in a variety of formats or architectures. In one embodiment, the file index database includes many entries, each entry corresponding to a file stored in a particular directory of the corresponding virtual disk file 1116, also referred to herein as a source virtual disk file, and storing metadata associated with the respective file. Metadata of a file may include information that can identify the file from the source virtual disk file, such as a file system record identifier (ID) identifying a file system record of the file compatible with a file system of the source virtual disk file, current and/or parent directory information of the file, and at least some file attributes of the file (e.g., at least some information from an inode of the file). The file index database may further include information describing the corresponding virtual disk file, such as virtual disk file header information or information associated with the corresponding VM, such that the source virtual disk file can be recreated based on information stored in the file index database.

The file index database can be utilized to back up data from a source virtual disk file, either a full backup or a partial backup, at a variety of granularity levels (e.g., block and/or file granularity level). In one embodiment, in response to a request to back up a subdirectory (also referred to as a subtree) of one or more files of a VM, backup engine 1106 accesses the file index database based on an identifier (e.g., directory name) of the requested subdirectory obtained from the request to identify a file system record or records associated with the requested subdirectory. Backup engine 1106 transmits the file system record identifying information to VMM 1112 to retrieve the data blocks corresponding to the file system records. Data blocks corresponding to the identified file system records are then backed up from the source virtual disk file of the remote data processing system without having to back up the remaining data of the source virtual disk file. The data blocks may further be deduplicated by deduplication storage engine 1107 before being stored in storage units 1108. Note that some functionality of backup engine 1106 as described above may be implemented within backup management server 1140 (or simply referred to as a backup server). Similarly, certain functionalities of backup server 1140 may be integrated with storage server 1104.

According to one embodiment, backup server 1140 includes, maintained therein, user interface 1144, VBA decommission module 1141, and decommission or backup policies 1142. User interface 1144 may be implemented as a graphical user interface (GUI) or a command-line interface (CLI) to allow a user such as an administrator to initiate and manage backup operations that back up data from clients 1101-1102 to backup storage system 1104, based on one or more backup policies 1142. Backup server 1140 further maintains backup metadata 1143 storing backup operations and/or statistics of the backup operations. Backup metadata 1143 may further include information identifying VBAs 1113-1114 whose backup operations are managed by backup server 1140.

According to one embodiment, VBA decommission module 1141 is configured to provide a user option to allow a user to decommission a VBA and its associated data and metadata, such that resources (e.g., storage space) associated with the VBA can be reclaimed for other usages. In one embodiment, in response to receiving a request to decommission a VBA, in this example, VBA 1113 of client 1102, VBA decommission module 1141 communicates with at least VMM 1112 of client 1102 via an API to remove data and/or metadata associated with VBA 1113 from a local storage (e.g., storage 1115) of client 1102. If there is backup data associated with VBA 1113 stored in storage system 1104, VBA decommission module 1141 communicates with storage system 1104 to remove or delete the backup data, as well as its associated metadata, from storage system 1104. VBA decommission module 1141 may further remove or delete backup metadata of VBA 1113 from backup metadata 1143 and unregister VBA 1113 from backup server 1140.

Figure 2:
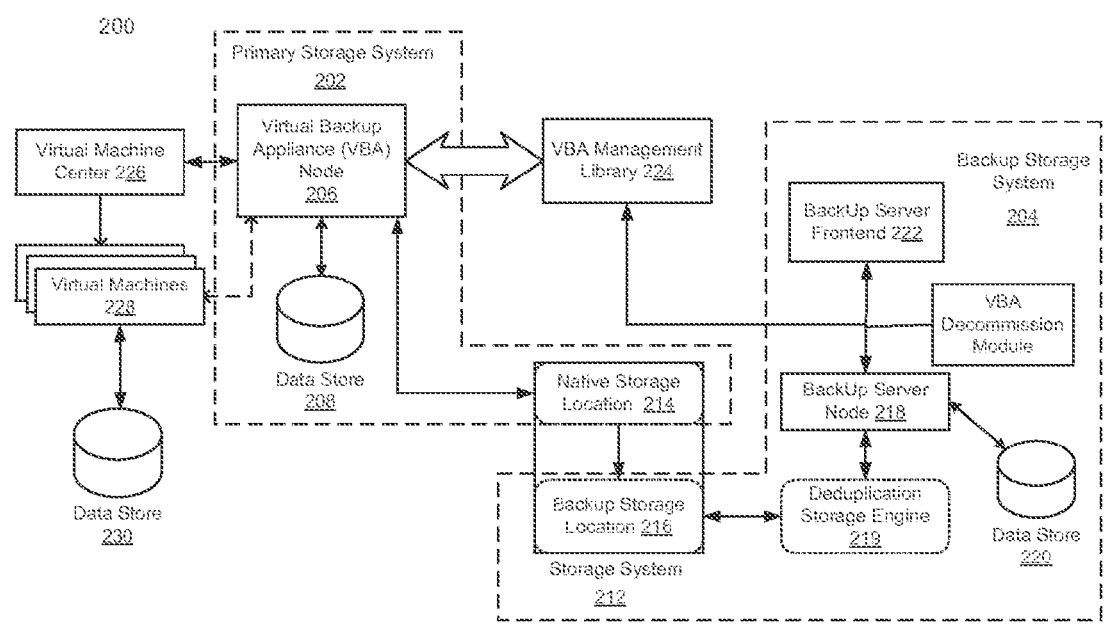
FIG. 2 is a block diagram illustrating certain transactions of decommissioning a VBA according to one embodiment.

FIG. 2 is a block diagram illustrating certain transactions of decommissioning a VBA according to one embodiment. In one embodiment, referring to FIG. 2, the backup and recovery network includes backup storage system 204 and primary storage system 202. Backup storage system includes backup storage location 216, deduplication engine 219, backup server node 218, data store 220, backup frontend 222. In one embodiment, primary storage system 202 includes VBA 206 and data store 208. In another embodiment primary storage 202 also includes native storage location 214 of storage system 212. In one embodiment storage system 212 is a Data Domain Replicator (DDR) also developed by EMC® Corporation. DDR also includes backup storage location 216. DDR is connected to backup server node 218 via a deduplication engine 219. In one embodiment, deduplication engine is included in the storage system 212. In one embodiment, the backup server node 218 is a central server in a centralized backup and recovery network.

VBA 206 is connected with various virtual machines 228 which are managed via the virtual machine center 226. Virtual machines 228 are each connected to their respective storage devices, represented as data store 230. In one embodiment, primary storage system 202, using VBA 206 backs up data and image files from virtual machines 228 stored in data store 230. Primary storage system 202, using VBA 206, can also backup image files of the virtual machines 228. In one embodiment image and data files are stored in data store 208. Data store 208 can represent the internal storage memory of VBA 206, a virtual disk drive directly or indirectly connected to VBA 206, or a physical disk drive connected to the VBA 206. In one embodiment, VBA 206 backs up data and/or files to native storage location 214 located in the internal storage memory of VBA 206. VBA 206 then saves metadata related to the data backup in its internal storage or data store 208. In an embodiment, the metadata includes pointers to the backed up data along with data retention policies related to the backed up data. In one embodiment, once VBA 206 backs up data/files at native storage location 214, VBA 206 then also synthesizes and transmits a data stream (related to the data backed up) to a location as specified by backup server node 218. In one embodiment, the data stream is transmitted in a common data stream format (CDSF) and is stored in the backup storage location 216. The location to save the CDSF stream is provided by the backup server node 218 and communicated to the VBA 206 via the VBA management library 224. In one embodiment, the data stream stored in the backup storage location 216 is saved in the CDSF format. Backup server node 218 then saves metadata related to the CDSF stream saved at backup storage location 216 at data store 220. Data store 220 can be an internal disk device or an external disk device connected to backup server node 218. Backup server node can be accessed by a user via the backup server frontend 222.

Metadata can be used for data recovery purposes, data delivery purposes, and data retention/deletion polices. Furthermore, metadata also helps the backup server node to identify the information/data present in a VBA. The pointers of the data are needed to provide access to data/files, regardless of the location they are stored in the system. Data retention policies present the policies based on which the data is preserved. In an event VBA 206 is unavailable or its metadata is lost/deleted, the associated data to the lost/deleted metadata becomes unavailable to the backup and recovery system. In such a scenario, a new VBA can be presented in the system which can use the CDSF stream (in association with the backup server node 218 and backup server nodes metadata) to recreate a new set of metadata and data lost due to the unavailability of VBA 206, thereby recovering data/files lost due to the unavailability of VBA 206. The new VBA will then synthesize a new CDSF stream and saving that data as described herein. Thus, while data/files lost due to the unavailability of VBA 206 can be recovered, a problem arises due to loss of accessibility of the data files stored by VBA 206, which would still be preserved at their stored location (assuming they are accessible via the network). This is because while the backed up data exists, the associated metadata is unavailable, thus "orphaning" the backed up data by VBA 206. Thus, by unregistering the VBA, by deleting all information related to the VBA, in the backup and recovery system and by freeing resources not used by the VBA anymore, the VBA can be decommissioned and reserouces can be preserved.

Figure 3:
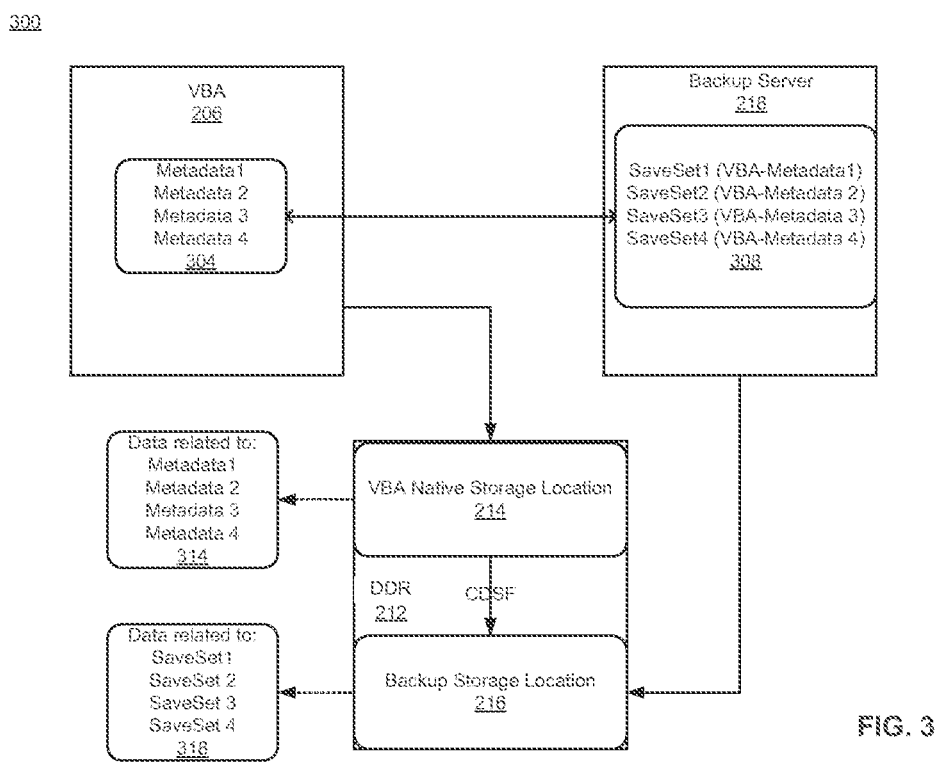
FIG. 3 is a simplified block diagram illustrating certain transactions of decommissioning a VBA according to another embodiment.

FIG. 3 is a simplified block diagram 300 illustrating certain transactions of decommissioning a VBA according to another embodiment. Referring to FIG. 3, VBA 206 stores (either locally or to an attached storage location) metadata 304 related to data 314. In one embodiment, data 314 is saved in storage system 212, e.g., DDR. In this embodiment data is stored in the VBA native storage location 214 of storage system 312. It should be noted that storage system 212 is only shown as an example, and data 314 can also be stored locally with VBA 206, either in its virtual storage device or an external storage device connected to VBA 206. In embodiment 300, the data stored in VBA native storage location 214 is then synthesized into a CDSF stream. The CDSF stream is saved at a location as specified by the backup server 218. In one embodiment the CDSF stream is saved to backup storage location 216 of the storage system 212. Data 318 saved at back storage location 216 is in a deduplicated stream format. In a deduplicated stream, data 314 is compared with the previously backed version, and only changes to data 314 since the last backed up version are stored. Backup server 218 also saves metadata 308 related to data stream 318 in its local data store. Thus, during recovery, if VBA 206 is unavailable, the CDSF streams pertaining to VBA 206 can be used to restore data 314, recovering VBA 206 to its present state. It should be noted, once a new VBA is used to assume the functionality of VBA 206, the new VBA will synthesize its own CDSF streams and associated metadata that is saved at the backup server node 218. Thus, in effect a new resource is added to the network, where the new resource assumes the responsibility of VBA 206. To provide data recovery, backup server 218 must know all the VBAs deployed in the network. At least for this purpose, all deployed VBAs must be registered with backup server 218.

As mentioned above, VBA 206 saves metadata related to data 314 and backup server 218 saves metadata 308 related to data 318. Data 314 and data 318 are related (data 318 being a backup data 314 in CDSF), thus, metadata 304 is related to metadata 308. In one embodiment, Metadata 304 includes pointer information to data 314 stored at VBA native storage location 214, and metadata 308 includes pointer information to data 318 stored at backup storage location 216. Thus, if VBA 206 is unreachable or corrupted, a new VBA can be created by using metadata 308 stored in backup server 218, and accessing data 318. Thus, the new VBA can take over the responsibilities and function of VBA 206. Backup server 218 can also clone the data 318 to another DDR (not shown). Metadata 304 and 308 can also include backup related policy information pertaining to the retention of data 314 and 316, respectively. These policies are used using which VBA 206 or backup server 218 retain or delete their respective data.

Figure 4:
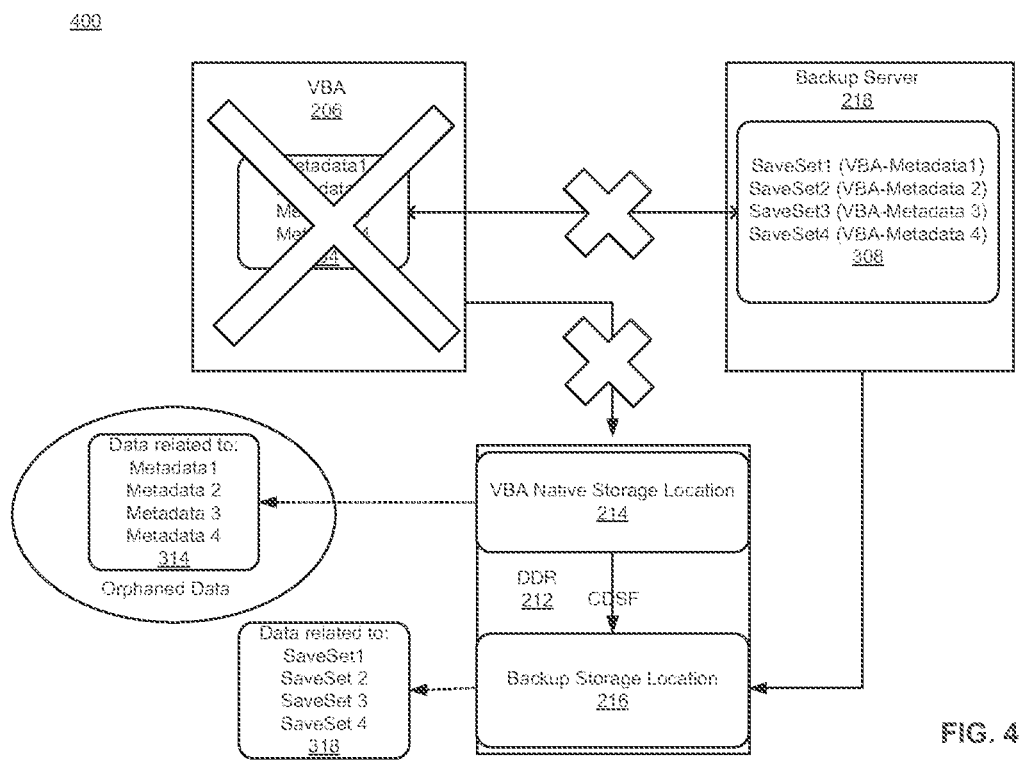
FIG. 4 is a simplified block diagram illustrating certain transactions of decommissioning a VBA according to another embodiment.

However, as described above a problem arises when VBA 206 is corrupted and/or unreachable as illustrated by another simplified embodiment 400 of FIG. 4. In simplified embodiment 400, VBA 206 is corrupted and/or unreachable. Thus, metadata 304, which included pointer information to data 314 stored at VBA native storage 214 of storage system 212 is unreachable. Also unreachable is data retention policies stored in metadata 304. Thus, while a new VBA can be created to replace VBA 206 (using the CDSF streams and metadata associated with the streams), the new VBA would have its own set of data and metadata. Thus, with data retention policies provided in metadata 304 being unavailable, data 318 stored in VBA native storage location 312 is unreachable and orphaned.

As described above, each VBA is registered with the backup server, at least in part, to provide data recovery so that backup server 218 can know all the VBAs deployed in the network. Registering a VBA informs the system about the availability of the VBA as a recourse. If a VBA 206 is unreachable or is offline due to data corruption, it may be feasible to start afresh and promote another virtual machine to presume the functionality of the VBA. Thus, VBA 206 needs to be decommissioned, that is, all associated data with VBA 206 needs to be purged from the network, and further VBA 206 needs to be unregistered from the backup server. Unregistering VBA 206 would result in the backup server node 218 removing VBA 206 as a backup resource from the backup and recovery network. The present invention describes techniques and embodiments to decommission a VBA by deleting all data and metadata related to the VBA (including all data saved as a CDSF stream associated with the VBA). Such a decommissioning process is needed to free disk space not used due to a loss of the VBA or its voluntary removal from the network.

Referring back to FIGS. 2-4, in one embodiment, decommissioning of a VBA can be automated and requested via a script or program. In any case, once backup server node 218 receives a request to decommission VBA 206 of primary storage system 202, backup server node 218 transmits the request via the VBA management library. In one embodiment, if the VBA is online and connected to the network, backup server node 218 transmits an instruction to delete the data 314 backed by VBA 206 from the primary storage system. In one embodiment, data 314 is stored internally in a virtual disk of VBA 206. In another embodiment, data 314 is stored in data store 208 of VBA 206. In yet another embodiment, data 214 is stored to an external disk drive connected to VBA 206. In one embodiment, data 214 is stored at a native storage location 214 of storage system 212. In one embodiment storage system 212 is a DDR. Backup server node 218 also instructs metadata 304 related to data 314 be deleted from the primary storage system associated with VBA 206. In one embodiment, metadata 304 is stored in the internal storage of VBA 206. If the backed up data was stored with the primary storage system only, then backup server node 218 would delete metadata 308 related to data 314 located in its data store 220, in an embodiment, and unregister VBA 206, completing the decommissioning of VBA 206. However, in one embodiment, if backup server node 218 determines that data 314 was saved in native storage location 214 of storage system 212, then backup server node 218 transmits an instruction to delete data 218 from storage system 212 of backup storage system 204, prior to deleting its metadata 308 from data store 220. Once all data and metadata associated with the VBA is deleted, VBA 206 is unregistered by backup server node 218, completing the decommissioning of VBA 206. In one embodiment, native storage location 214 stores data in its native format and the backup storage location 216 stores data in a CDSF stream, as described above.

However, if VBA 206 is unreachable via the network (such can happen when the VBA is not functioning anymore or is corrupted or removed from the network), then upon receiving an instruction to decommission VBA 206, backup server determines whether data 314 is reachable via the primary storage system 202. In one embodiment, if VBA 206 had saved data 314 to native storage location 214, backup server node 218 instructs that data be deleted from storage system 212. Backup server node then also determines if data 318 was saved at backup storage location 216. If so, backup server node instructs data 318 from backup storage location also be deleted, prior to deleting metadata 308 from its local data store 220. Thereafter, backup server node would unregister VBA 206, decommissioning the VBA from the backup and recovery network. In this manner decommissioning ensures that no data, including data 314 and 318, are residing in the backup storage system 204 if the VBA is unregistered from the network. In one embodiment, if VBA 206 is offline, a user is given an option to either continue with the decommissioning of VBA 206, or abort the process. In one embodiment, such options are presented to the user via the backup server frontend 222.

Figure 5:
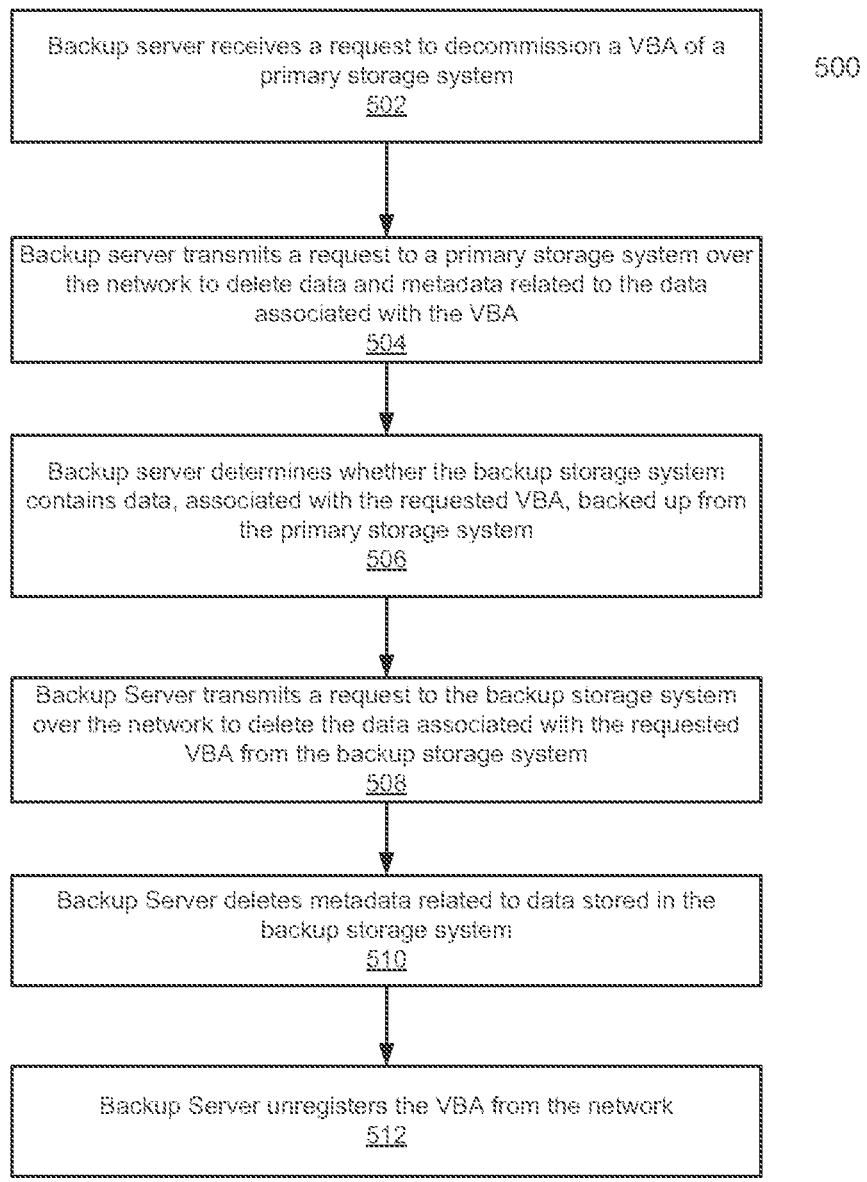
FIG. 5 is a flow diagram illustrating a method of decommissioning a VBA in accordance to an embodiment of the invention.

FIG. 5 is a flow diagram illustrating a method of decommissioning a VBA in accordance to an embodiment of the invention. Method 500 may be performed by processing logic which may include software, hardware, or a combination thereof. Referring to FIG. 5, as represented by block 502, backup server receives a request to decommission a VBA of a primary storage system. In one embodiment, such a request is provided by a user via a user interface such as user interface 1144 of FIG. 1. In another embodiment, the request is transmitted to the backup server via an automated script or program. In one embodiment, the backup server is configured to manage backup operations to back up data from at least one primary storage system to a backup storage system over a network, where the primary storage system has at least one VBA to carry out backup operations. At block 504, the backup server transmits a request to the primary storage system, over the network, to delete data and metadata related to the data associated with the VBA. In one embodiment, such a request is transmitted in response to the request to decommission the VBA. At block 506, the backup server determines whether the backup storage system contains data associated with the VBA, backed up from the primary storage system. At block 510, upon determining that the backup storage system contains data associated with the VBA, the backup server transmits another request to the backup storage system over the network to delete the data associated with the VBA from the backup storage system. At block 512 the backup server unregisters the VBA from the backup and recovery network, where unregistering the VBA results in completely removing all references of the virtual backup appliance from the central data backup and recovery network.

In one embodiment, the primary storage system includes the VBA's internal storage. In another embodiment, the primary storage system includes an external storage device coupled to the VBA. In yet another embodiment, the primary storage system includes a native storage location on a storage system, e.g., DDR.

Figure 6:
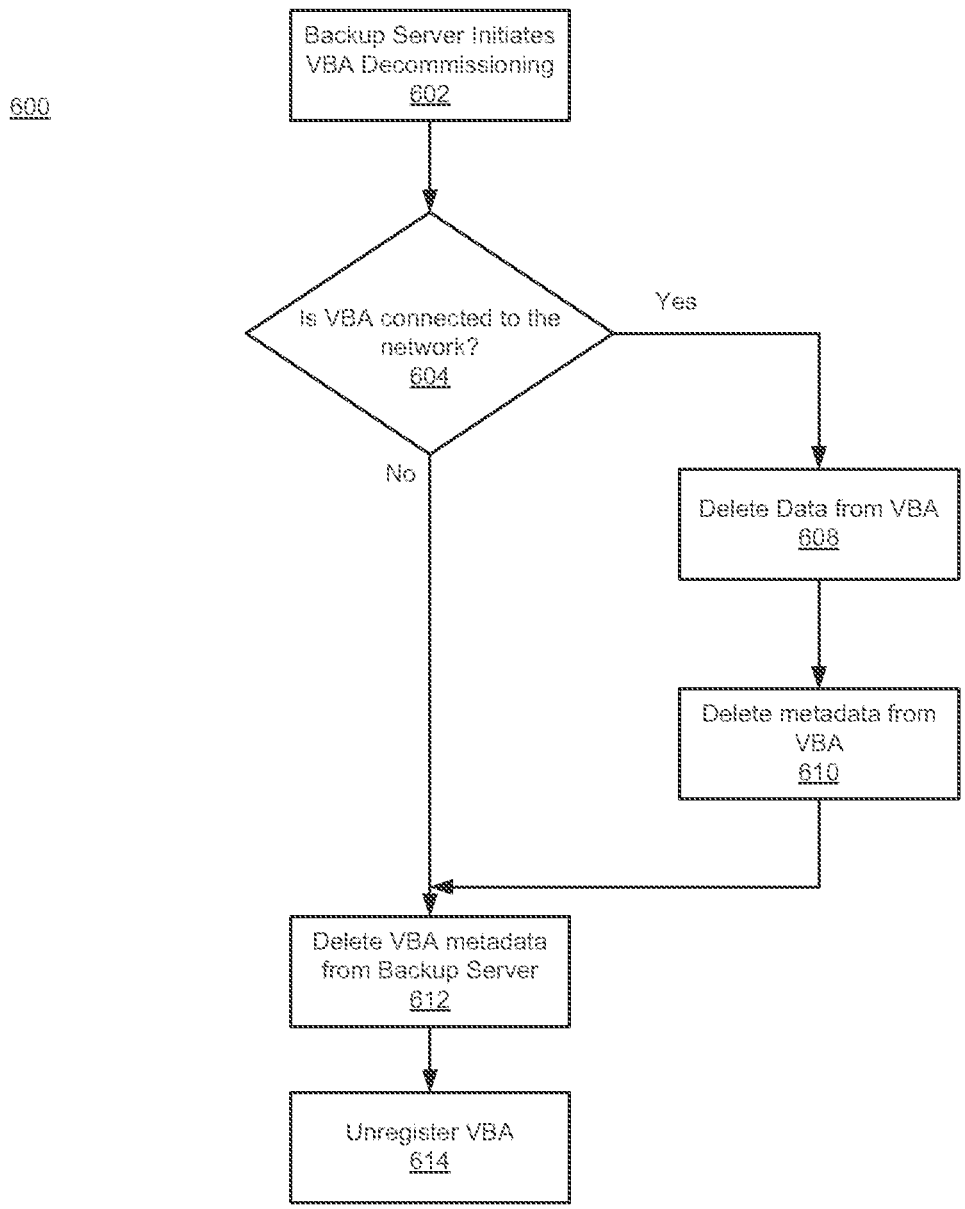
FIG. 6 is a flow diagram illustrating a method for decommissioning a VBA when the VBA saves the backed up data to its local storage, in accordance to an embodiment of the invention.

FIG. 6 is a flow diagram illustrating a method for decommissioning a VBA when the VBA saves the backed up data to its local storage, in accordance to an embodiment of the invention. In one embodiment, at block 602 backup server initiates decommissioning a VBA. At block 604 it is determined if the VBA is reachable via the network. In one embodiment, if it is determined that the VBA is unavailable, a user is given an option to abort the decommissioning. In another embodiment, at block 608, if the VBA is connected to the network, backup server transmits a request to delete data from the VBA. At block 610, the backup server requests deletion of the metadata related to the deleted data from the VBA. However, in one embodiment, if it is determined that the VBA is not reachable, backup server would delete the VBA metadata from its local data store/internal store, as represented at 612. The backup server then unregisters the VBA, as shown at 614. It should be noted, in this embodiment, because the VBA only saves data to its internal storage, no data stream is synthesized and transmitted to the storage system (e.g., DDR).

Figure 7:
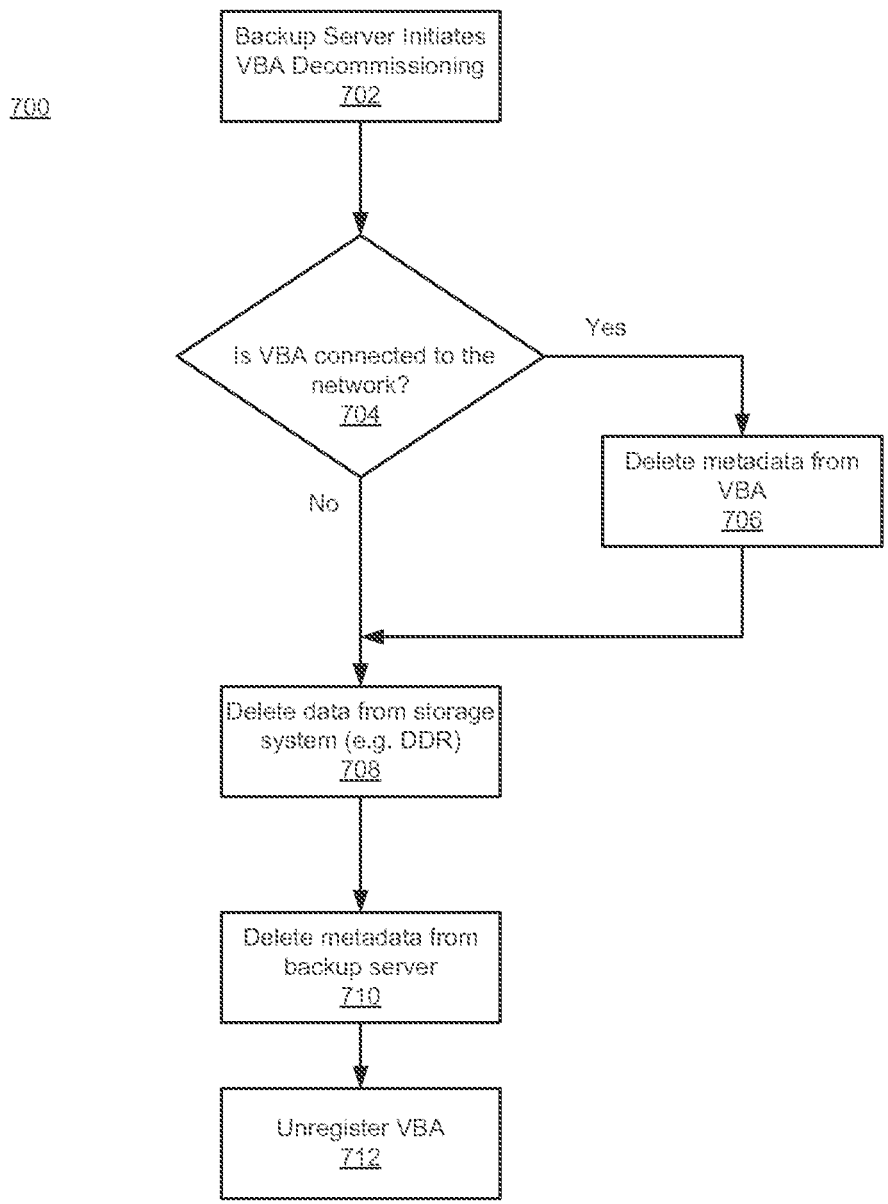
FIG. 7 is a flow diagram illustrating a method for decommissioning a VBA when the VBA saves the backed up data to a backup storage system, in accordance to an embodiment of the invention.

FIG. 7 is a flow diagram illustrating a method for decommissioning a VBA when the VBA saves the backed up data to a backup storage system, in accordance with an embodiment of the invention. In one embodiment, the backup storage system includes a storage system, e.g., DDR to which the VBA stores its data (the backup from other virtual machines). At block 702, backup server initiates the VBA decommissioning. At block 704 it is determined if the VBA is reachable and/or connected to the network. If so, at block 706, the backup server requests metadata from the VBA deleted. However, if the VBA is not reachable, and the user does not abort the decommissioning, in one embodiment (as described above) then metadata cannot be deleted from the VBA, and the decommissioning of the VBA proceeds. At block 708 data related to the VBA is deleted. This includes data saved at the VBA's native storage location and the CDSF stream stored in the backup storage system, At block 710, backup server deletes the metadata from its local internal storage. At block 712 the VBA is unregistered, by the backup server, from the data and recovery network.

Figure 8:
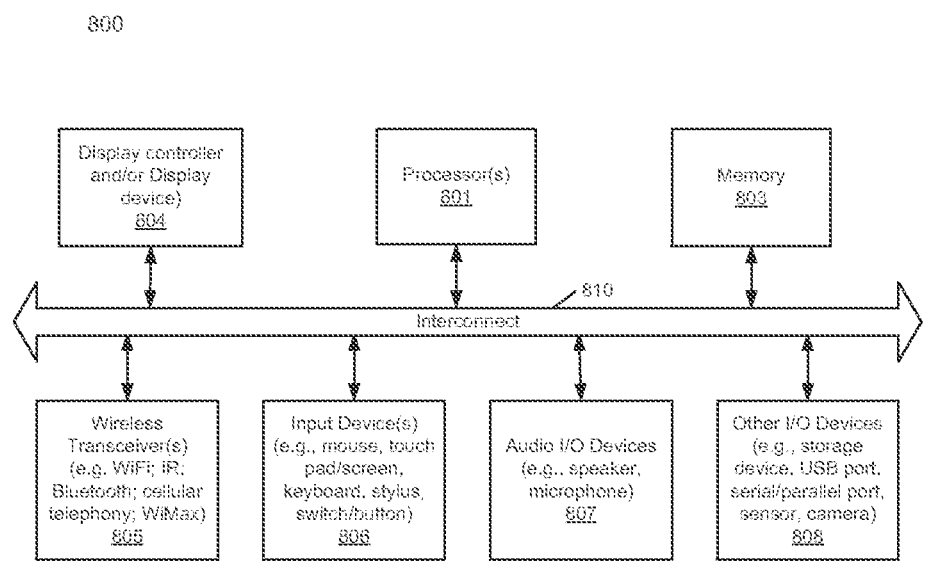
FIG. 8 is a block diagram illustrating an example of a data processing system which may be used as a backup server with one embodiment of the invention.

FIG. 8 is a block diagram illustrating an example of a data processing system which may be used as a backup server with one embodiment of the invention. For example, system 800 may represents any of data processing systems described above performing any of the processes or methods described above. System 800 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 800 is intended to show a high level view of many components of the computer system. However, it is to be understood that additional components may be present in certain implementations and furthermore, different arrangement of the components shown may occur in other implementations. System 800 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof.

In one embodiment, system 800 includes processor 801, memory 803, and devices 805-808 via a bus or an interconnect 810. Processor 801 may represent a single processor or multiple processors with a single processor core or multiple processor cores included therein. Processor 801 may represent one or more general-purpose processors such as a microprocessor, a central processing unit (CPU), or the like. More particularly, processor 801 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 801, which may be a low power multi-core processor socket such as an ultra low voltage processor, may act as a main processing unit and central hub for communication with the various components of the system. Such processor can be implemented as a system on chip (SoC). In one embodiment, processor 801 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments.

Processor 801 is configured to execute instructions for performing the operations and steps discussed herein. System 800 further includes a graphics interface that communicates with graphics subsystem 804, which may include a display controller and/or a display device.

Processor 801 may communicate with memory 803, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 208-2E (published April 2008), or a next generation LPDDR standard to be referred to as LPDDR3 that will offer extensions to LPDDR2 to increase bandwidth. As examples, 2/4/8 gigabytes (GB) of system memory may be present and can be coupled to processor 810 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

Memory 803 may include one or more volatile storage (or memory) devices such as random access memory (RAM), dynamic RAM (DRAM), synchronous DRAM (SDRAM), static RAM (SRAM), or other types of storage devices. Memory 803 may store information including sequences of instructions that are executed by processor 801, or any other device. For example, executable code and/or data of a variety of operating systems, device drivers, firmware (e.g., input output basic system or BIOS), and/or applications can be loaded in memory 803 and executed by processor 801. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 800 may further include IO devices such as devices 805-808, including wireless transceiver(s) 805, input device(s) 806, audio IO device(s) 807, and other IO devices 808. Wireless transceiver 805 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof.

Input device(s) 806 may include a mouse, a touch pad, a touch sensitive screen (which may be integrated with display device 804), a pointer device such as a stylus, and/or a keyboard (e.g., physical keyboard or a virtual keyboard displayed as part of a touch sensitive screen). For example, input device 806 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO device 807 may include a speaker and/or a microphone to facilitate voice-enabled functions, such as voice recognition, voice replication, digital recording, and/or telephony functions. Other optional devices 808 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 808 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 810 via a sensor hub (not shown), while other devices such as a keyboard or thermal sensor may be controlled by an embedded controller (not shown), dependent upon the specific configuration or design of system 800.

To provide for persistent storage of information such as data, applications, one or more operating systems and so forth, a mass storage (not shown) may also couple to processor 801. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 801, e.g., via a serial peripheral interface (SPI). This flash device may provide for non-volatile storage of system software, including a basic input/output software (BIOS) as well as other firmware of the system.

Note that while system 800 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Figure 9:
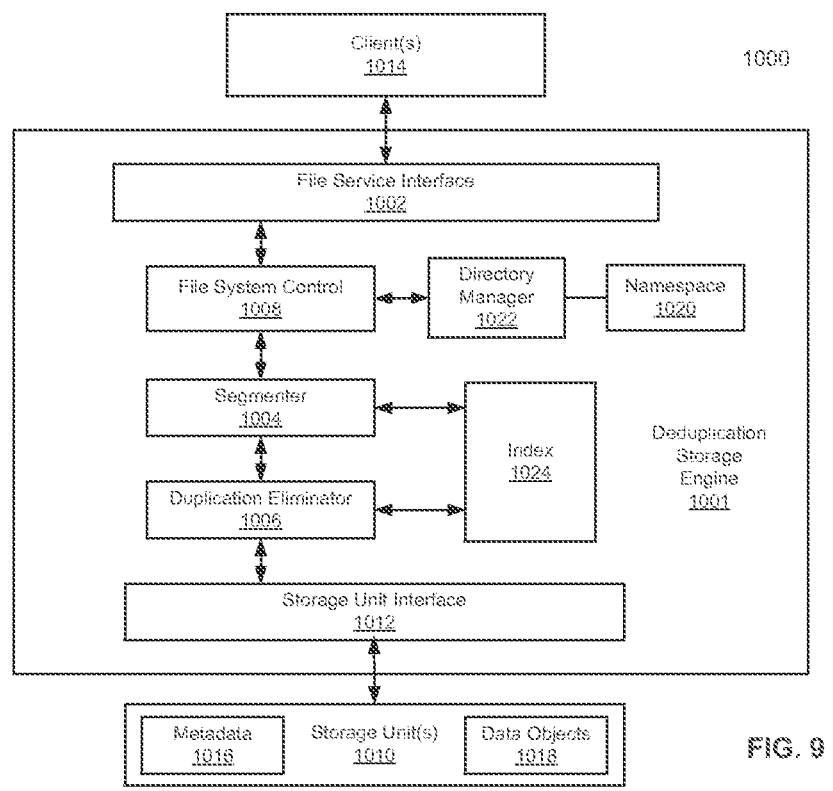
FIG. 9 is a block diagram illustrating a deduplication storage system according to one embodiment of the invention.

FIG. 9 is a block diagram illustrating a deduplication storage system according to one embodiment of the invention. For example, deduplication storage system 1000 may be implemented as part of a deduplication storage system as described above, such as, for example, the deduplication storage system as a client and/or a server as shown in FIG. 1. In one embodiment, storage system 1000 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 1000 may have a distributed architecture, or all of its components may be integrated into a single unit. Storage system 1000 may be implemented as part of an archive and/or backup system such as a deduplicating storage system available from EMC® Corporation of Hopkinton, Mass.

In one embodiment, storage system 1000 includes a deduplication engine 1001 interfacing one or more clients 1014 with one or more storage units 1010 storing metadata 1016 and data objects 1018. Clients 1014 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 1010 may be implemented locally (e.g., single node operating environment) or remotely (e.g., multi-node operating environment) via an interconnect, which may be a bus and/or a network (e.g., a storage network). In one embodiment, one of storage units 1010 operates as an active storage to receive and store external or fresh user data from a client (e.g., an end-user client or a primary storage system associated with one or more end-user clients), while the another one of storage units 1010 operates as a target storage unit to periodically archive data from the active storage unit according to an archiving policy or scheme. Storage units 1010 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1010 may also be combinations of such devices. In the case of disk storage media, the storage units 1010 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 1016, may be stored in at least some of storage units 1010, such that files can be accessed independent of another storage unit. Metadata of each storage unit includes enough information to provide access to the files it contains. In one embodiment, metadata may include fingerprints contained within data objects 1018, where a data object may represent a data chunk, a compression region (CR) of one or more data chunks, or a container of one or more CRs. Fingerprints are mapped to a particular data object via metadata 1016, enabling the system to identify the location of the data object containing a data chunk represented by a particular fingerprint. A fingerprint may be generated based on at least a portion of a data chunk, for example, by applying a predetermined mathematical algorithm (e.g., hash function) to at least a portion of the content of the data chunk. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 1016 may include a file name, a storage unit identifier (ID) identifying a storage unit in which the chunks associated with the file name are stored, reconstruction information for the file using the chunks, and any other appropriate metadata information. Metadata 1016 may further include a chunk ID, a chunk sketch, a hash of a chunk, an encrypted hash of a chunk, random data, or any other appropriate metadata. In some embodiments, metadata associated with a chunk is used to identify identical and/or similar data segments. The stored metadata enables a faster identification of identical and/or similar data chunks as an ID and/or sketch (e.g., a set of values characterizing the chunk) do not need to be recomputed for the evaluation of a given incoming data segment.

In one embodiment, a chunk ID includes one or more deterministic functions of a data chunk, one or more hash functions of a data chunk, random data, or any other appropriate data chunk ID. In various embodiments, a data chunk sketch includes one or more deterministic functions of a data chunk, one or more hash functions of a data chunk, one or more functions that return the same or similar value for the same or similar data chunks (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a chunk. For example, a sketch may be generated by applying one or more functions (e.g., hash functions) on a chunk and a subset of the results of the functions performed on the chunk (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 1001 includes file service interface 1002, segmenter 1004, duplicate eliminator 1006, file system control 1008, and storage unit interface 1012. Deduplication storage engine 1001 receives a file or files (or data item(s)) via file service interface 1002, which may be part of a file system namespace 1020 of a file system associated with the deduplication storage engine 1001. The file system namespace 1020 refers to the way files are identified and organized in the system. An example is to organize the files hierarchically into directories or folders, which may be managed by directory manager 1022. File service interface 1012 supports a variety of protocols, including a network file system (NFS), a common Internet file system (CIFS), and a virtual tape library interface (VTL), etc.

The file(s) is/are processed by segmenter 1004 and file system control 1008.

Segmenter 1004, also referred to as a content store, breaks the file(s) into variable-length chunks based on a variety of rules or considerations. For example, the file(s) may be broken into chunks by identifying chunk boundaries. Chunk boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more chunks that originally made up a data block, data stream, file, or directory that was/were previously stored.

In some embodiments, chunks are segmented by identifying chunk boundaries that are content-based—for example, a hash function is applied to values of data within a sliding window through the data stream or block and when the hash function is equal to a value (or equal to one of several values) then a chunk boundary is identified. In various embodiments, chunk boundaries are identified using content based functions operating on windows within a data stream or block that have a minimum or maximum or other value or any other appropriate content based chunking algorithm. In various embodiments, chunks include fixed-length chunks, variable length chunks, overlapping chunks, non-overlapping chunks, chunks with a minimum size, chunks with a maximum size, or any other appropriate chunks. In various embodiments, chunks include files, groups of files, directories, a portion of a file, a portion of a data stream with one or more boundaries unrelated to file and/or directory boundaries, or any other appropriate chunk.

In one embodiment, file system control 1008, also referred to as a file system manager, processes information to indicate the chunk(s) association with a file. In some embodiments, a list of fingerprints is used to indicate chunk(s) associated with a file. File system control 1008 passes chunk association information (e.g., representative data such as a fingerprint) to index 1024. Index 1024 is used to locate stored chunks in storage units 1010 via storage unit interface 1012. Duplicate eliminator 1006, also referred to as a segment store, identifies whether a newly received chunk has already been stored in storage units 1010. In the event that a chunk has already been stored in storage unit(s), a reference to the previously stored chunk is stored, for example, in a chunk tree associated with the file, instead of storing the newly received chunk. A chunk tree of a file may include one or more nodes and each node represents or references one of the deduplicated chunks stored in storage units 1010 that make up the file. Chunks are then packed by a container manager (which may be implemented as part of storage unit interface 1012) into one or more storage containers stored in storage units 1010. The deduplicated chunks may be further compressed into one or more CRs using a variation of compression algorithms, such as a Lempel-Ziv algorithm before being stored. A container may contain one or more CRs and each CR may contain one or more deduplicated chunks (also referred to deduplicated segments). A container may further contain the metadata such as fingerprints, sketches, type of the data chunks, etc. that are associated with the data chunks stored therein.

When a file is to be retrieved, file service interface 1002 is configured to communicate with file system control 1008 to identify appropriate chunks stored in storage units 1010 via storage unit interface 1012. Storage unit interface 1012 may be implemented as part of a container manager. File system control 1008 communicates (e.g., via segmenter 1004) with index 1024 to locate appropriate chunks stored in storage units via storage unit interface 1012. Appropriate chunks are retrieved from the associated containers via the container manager and are used to construct the requested file. The file is provided via interface 1002 in response to the request. In one embodiment, file system control 1008 utilizes a tree (e.g., a chunk tree obtained from namespace 1020) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1001 may be implemented in software (e.g., executable code executed in a memory by a processor), hardware (e.g., processor(s)), or a combination thereof. For example, deduplication engine 1001 may be implemented in a form of executable instructions that can be stored in a machine-readable storage medium, where the instructions can be executed in a memory by a processor.

In one embodiment, storage system 1000 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for managing resources of virtual backup appliances, the method comprising:

receiving, by a backup server, a request to decommission a virtual backup appliance (VBA) of a first primary storage system, the backup server configured to manage backup operations to back up data from a plurality of primary storage systems to a backup storage system over a network, each primary storage system having one or more VBAs that carry out backup operations respectively;

in response to the request, transmitting a first request from the backup server to the first primary storage system over the network to delete data and first metadata related to the data associated with the requested VBA;

determining whether the backup storage system contains data associated with the requested VBA that has been backed up from the first primary storage system;

upon determining that the backup storage system contains the data associated with the requested VBA, transmitting a second request to the backup storage system over the network to delete the data associated with the requested VBA from the backup storage system;

deleting second metadata associated with the requested VBA from the backup server;

unregistering the requested VBA from the backup server, wherein unregistering the requested VBA results in completely removing all references of the requested VBA from a central data backup and recovery network; and providing an option to either continue or abort decommissioning of the requested VBA if the first primary storage system in unavailable over the network.

2. The method of claim 1, wherein the VBA associated with the first of the primary storage system stores at least one of the first metadata or the data in a virtual storage system.

3. The method of claim 1, wherein the backup storage system saves the data in a common data stream format.

4. The method of claim 1, wherein the first and second metadata comprises at least one of pointers to the data or policies related to backing up the data.

5. The method of claim 1, wherein the second metadata associated with the requested VBA from the backup server is related to the data in the backup storage system.

6. A method for managing resources of virtual backup appliances, the method comprising:

receiving, by a backup server, a request to decommission a virtual backup appliance (VBA) of a first primary storage system, the backup server configured to manage backup operations to back up data from a plurality of primary storage systems to a backup storage system over a network, each primary storage system having one or more VBAs that carry out backup operations respectively;

in response to the request, transmitting a first request from the backup server to the first primary storage system over the network to delete data and first metadata related to the data associated with the requested VBA;

determining whether the backup storage system contains data associated with the requested VBA that has been backed up from the first primary storage system;

upon determining that the backup storage system contains the data associated with the requested VBA, transmitting a second request to the backup storage system over the network to delete the data associated with the requested VBA from the backup storage system;

deleting second metadata associated with the requested VBA from the backup server; and unregistering the requested VBA from the backup server, wherein unregistering the requested VBA results in completely removing all references of the requested VBA from a central data backup and recovery network, wherein the backup storage system comprises a data replicator, the data replicator storing the data after deduplicating the data.

7. A non-transitory machine readable medium comprising instructions for managing resources of virtual backup appliances, which when executed by a computing system, cause the computing system to perform operations, the operations comprising:

receiving a request to decommission a virtual backup appliance (VBA) of a first primary storage system, the backup server configured to manage backup operations to back up data from a plurality of primary storage systems to a backup storage system over a network, each primary storage system having one or more VBAs that carry out backup operations respectively;

in response to the request, transmitting a first request from the backup server to the first primary storage system over the network to delete data and first metadata related to the data associated with the requested VBA;

determining whether the backup storage system contains data associated with the requested VBA that has been backed up from the first primary storage system;

upon determining that the backup storage system contains the data associated with the requested VBA, transmitting a second request to the backup storage system over the network to delete the data associated with the requested VBA from the backup storage system;

deleting second metadata associated with the requested VBA from the backup server;

unregistering the requested VBA from the backup server, wherein unregistering the requested VBA results in completely removing all references of the requested VBA from a central data backup and recovery network; and providing an option to either continue or abort decommissioning of the requested VBA if the first primary storage system in unavailable over the network.

8. The non-transitory computer readable medium of claim 7, wherein the VBA associated with the first of the primary storage system stores at least one of the first metadata or the data in a virtual storage system.

9. The non-transitory computer readable medium of claim 7 wherein the backup storage system saves the data in a common data stream format.

10. The non-transitory computer readable medium of claim 7, wherein the first and second metadata comprises at least one of pointers to the data or policies related to backing up the data.

11. The non-transitory computer readable medium of claim 7, wherein the second metadata associated with the requested VBA from the backup server is related to the data in the backup storage system.

12. A non-transitory machine readable medium comprising instructions for managing resources of virtual backup appliances, which when executed by a computing system, cause the computing system to perform operations, the operations comprising:

receiving, by a backup server, a request to decommission a virtual backup appliance (VBA) of a first primary storage system, the backup server configured to manage backup operations to back up data form a plurality of primary storage systems to a backup storage system over a network, each primary storage system having one or more VBAs that carry out backup operations respectively;

in response to the request, transmitting a first request from the backup server to the first primary storage system over the network to delete data and first metadata related to the data associated with the requested VBA;

determining whether the backup storage system contains data associated with the requested VBA that has been backed up from the first primary storage system;

upon determining that the backup storage system contains the data associated with the requested VBA, transmitting a second request to the backup storage system over the network to delete the data associated with the requested VBA from the backup storage system;

deleting second metadata associated with the requested VBA from the backup server; and unregistering the requested VBA from the backup server, wherein unregistering the requested VBA results in completely removing all references of the requested VBA from a central data backup and recovery network, wherein the backup storage system comprises a data replicator, the data replicator storing the data after deduplicating the data.

13. A data processing system comprising:

a processing system; and a memory coupled to the processing system storing instructions, which when executed from the memory, cause the processing system to:

receive a request to decommission a virtual backup appliance (VBA) of a first primary storage system, the backup server configured to manage backup operations to back up data from a plurality of primary storage systems to a backup storage system over a network, each primary storage system having one or more VBAs that carry out backup operations respectively, in response to the request, transmit a first request from the backup server to the first primary storage system over the network to delete data and first metadata related to the data associated with the requested VBA, determine whether the backup storage system contains data associated with the requested VBA that has been backed up from the first primary storage system, upon determining that the backup storage system contains the data associated with the requested VBA, transmit a second request to the backup storage system over the network to delete the data associated with the requested VBA from the backup storage system, delete second metadata associated with the requested VBA from the backup server, unregister the requested VBA from the backup server, wherein unregistering the requested VBA results in completely removing all references of the requested VBA from a central data backup and recovery network, and provide an option to either continue or abort decommissioning of the requested VBA if the first primary storage system in unavailable over the network.

14. The system of claim 13, wherein the VBA associated with the first of the primary storage system stores at least one of the first metadata or the data in a virtual storage system.

15. The system of claim 13, wherein the first and second metadata comprises at least one of pointers to the data or policies related to backing up the data.

16. The system of claim 13, wherein the second metadata associated with the requested VBA from the backup server is related to the data in the backup storage system.

17. The system of claim 13, wherein the backup storage system saves the data in a common data stream format.

18. A data processing system comprising:
- a processing system; and
- a memory coupled to the processing system storing instructions, which when executed from the memory, cause the processing system to:
  - receive a request to decommission a virtual backup appliance (VBA) of a first primary storage system, the backup server configured to manage backup operations to back up data from a plurality of primary storage systems to a backup storage system over a network, each primary storage system having one or more VBAs that carry out backup operations respectively,
  - in response to the request, transmit a first request from the backup server to the first primary storage system over the network to delete data and first metadata related to the data associated with the requested VBA,
  - determine whether the backup storage system contains data associated with the requested VBA that has been backed up from the first primary storage system,
  - upon determining that the backup storage system contains the data associated with the requested VBA, transmit a second request to the backup storage system over the network to delete the data associated with the requested VBA from the backup storage system,
  - delete second metadata associated with the requested VBA from the backup server, and
  - unregister the requested VBA from the backup server, wherein unregistering the request VBA results in completely removing all references of the requested VBA from a central data backup and recovery network, wherein the backup storage system comprises a data replicator, the data replicator storing the data after deduplicating the data.

\* \* \* \* \*